(12) United States Patent
Tsai et al.

(10) Patent No.: US 7,802,786 B2
(45) Date of Patent: Sep. 28, 2010

(54) DUPLEX AUTOMATIC DOCUMENT FEEDER AND DUPLEX DOCUMENT SCANNING METHOD USING THE SAME

(75) Inventors: Chen-Tsai Tsai, Taipei (TW); Keng-Wei Shih, Taipei (TW); Hsuan-Yang Lin, Taipei (TW)

(73) Assignee: Lite-On Technology Corp., Taipei (TW)

( * ) Notice: Subject to any disclaimer, the term of this patent is extended or adjusted under 35 U.S.C. 154(b) by 177 days.

(21) Appl. No.: 12/003,800

(22) Filed: Jan. 2, 2008

(65) Prior Publication Data

US 2008/0179819 A1    Jul. 31, 2008

Related U.S. Application Data

(63) Continuation-in-part of application No. 11/699,374, filed on Jan. 30, 2007, now Pat. No. 7,578,504.

(30) Foreign Application Priority Data

Aug. 13, 2007    (TW) .............................. 96129815 A

(51) Int. Cl.
    *B65H 29/00* (2006.01)
(52) U.S. Cl. ...................... 271/186; 271/184; 271/3.14; 271/3.18; 271/3.19; 271/301; 271/302; 271/303; 271/304; 271/3.01; 399/364
(58) Field of Classification Search ................ 271/3.14, 271/3.18, 3.19, 301, 302, 303, 304, 225, 271/184, 186, 3.01; 399/364
See application file for complete search history.

(56) References Cited

U.S. PATENT DOCUMENTS

| | | | | |
|---|---|---|---|---|
| 5,784,680 A * | 7/1998 | Taruki | ......................... | 399/374 |
| 5,995,801 A * | 11/1999 | Katsuta et al. | .............. | 399/367 |
| 6,233,068 B1 * | 5/2001 | Kondo | ......................... | 358/498 |
| 6,434,359 B2 * | 8/2002 | Nose et al. | .................. | 399/374 |
| 6,529,259 B1 * | 3/2003 | Kono | ........................... | 355/23 |
| 6,796,559 B2 * | 9/2004 | Hirota et al. | ................. | 271/225 |
| 7,626,735 B2 * | 12/2009 | Mizuhashi et al. | .......... | 358/474 |
| 2003/0227654 A1 * | 12/2003 | Shiraishi | ..................... | 358/474 |
| 2008/0042344 A1 * | 2/2008 | Song | .......................... | 271/303 |

* cited by examiner

*Primary Examiner*—Patrick Mackey
*Assistant Examiner*—Prasad V Gokhale
(74) *Attorney, Agent, or Firm*—Rosenberg, Klein & Lee

(57) ABSTRACT

A duplex automatic document feeder includes first, second, third, and fourth paths, an ejecting path, a scanning module, first and second reversing roller units, a feeding tray, and an ejecting tray. A document is moved from the feeding tray to the scanning module for scanning of a first side surface thereof. Subsequently, the document is moved along a second-side scanning path defined by the first reversing roller unit, the third path, a portion of the first path, the fourth path, and the first reversing roller unit to allow for scanning of a second side surface thereof. After the first and second side surfaces are scanned, the document is moved along a document-inverting path defined by the second reversing roller unit, a portion of the fourth path, the ejecting path, a portion of the second path, the first reversing roller unit, and the ejecting tray.

4 Claims, 18 Drawing Sheets

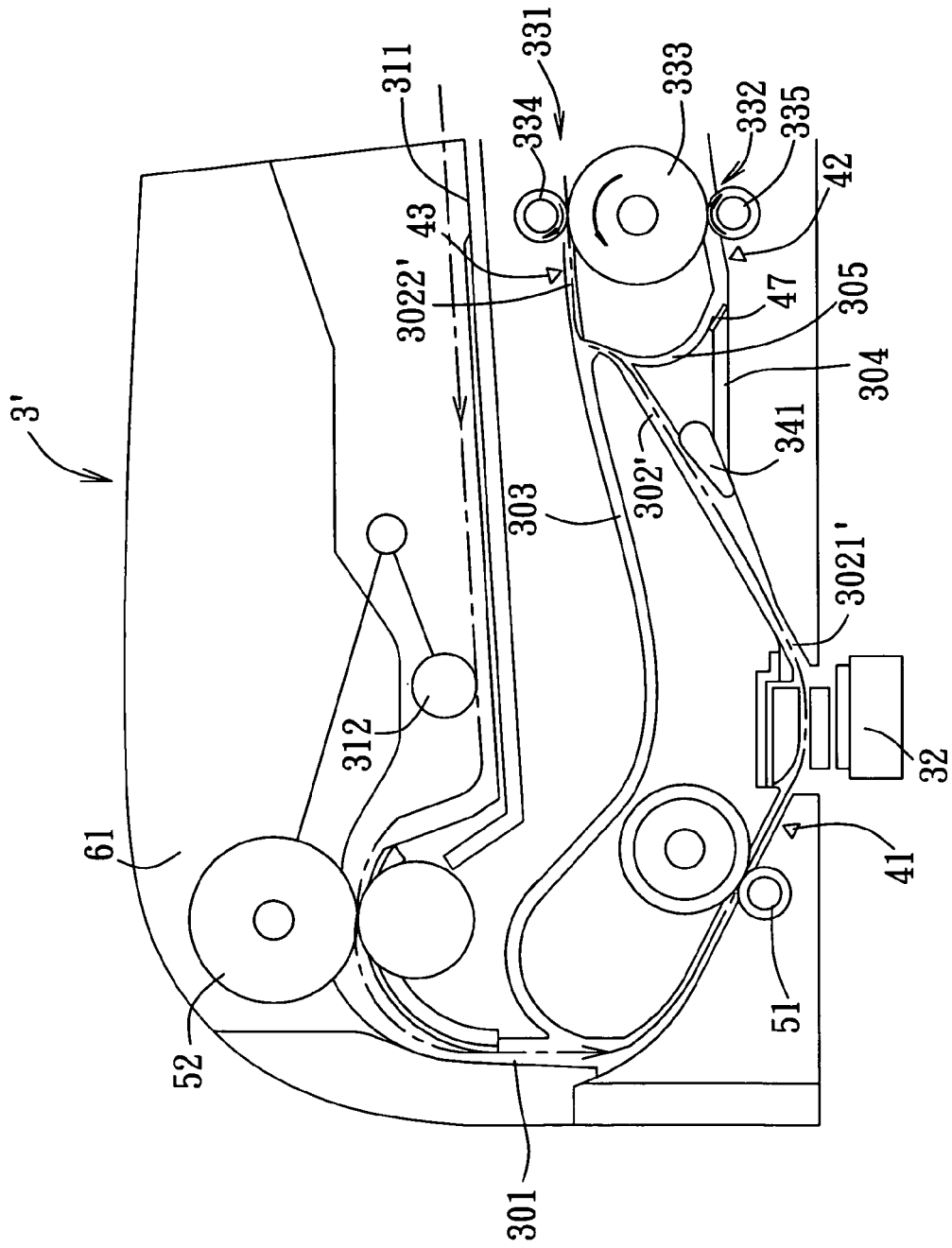
F I G. 5a

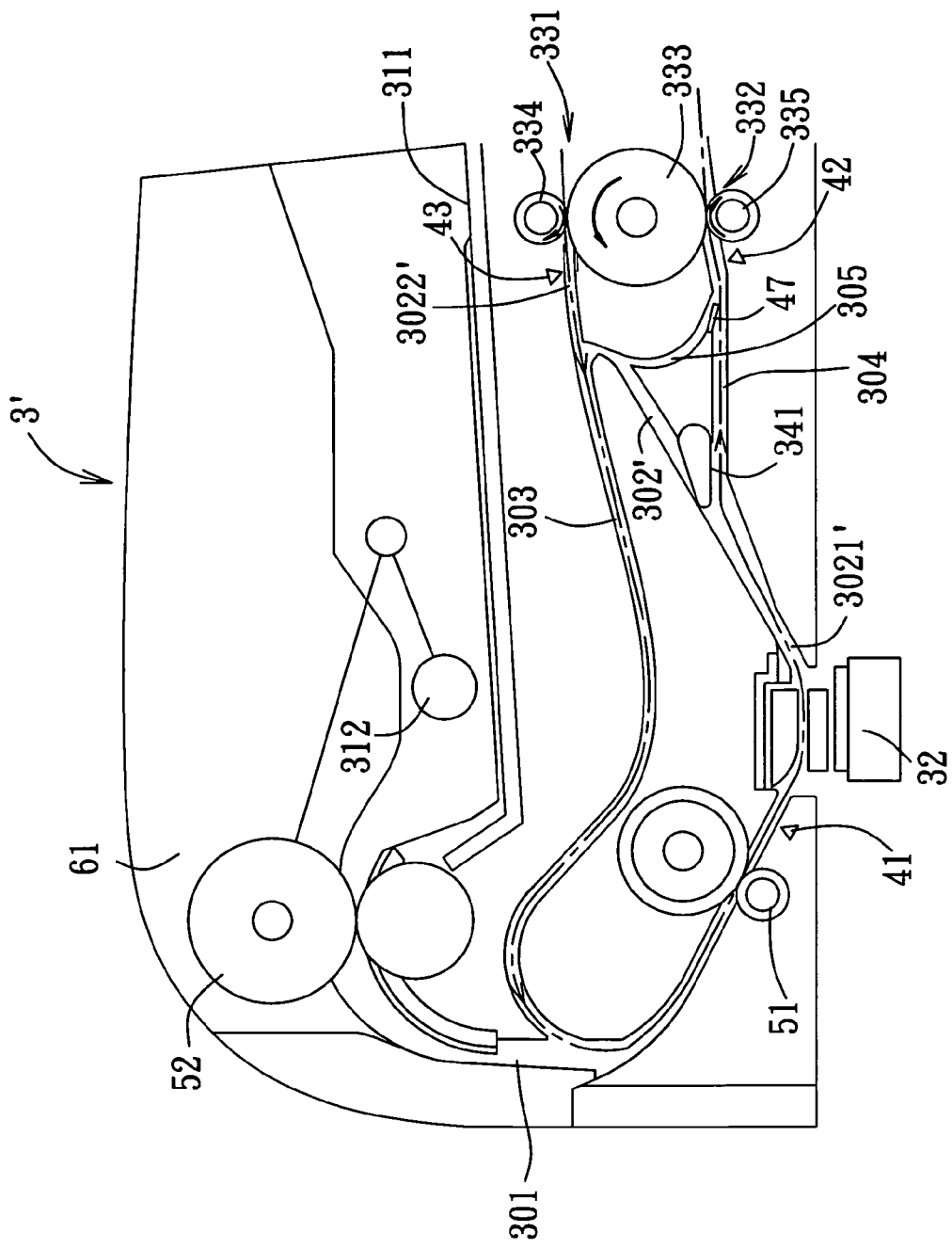
F I G. 5b

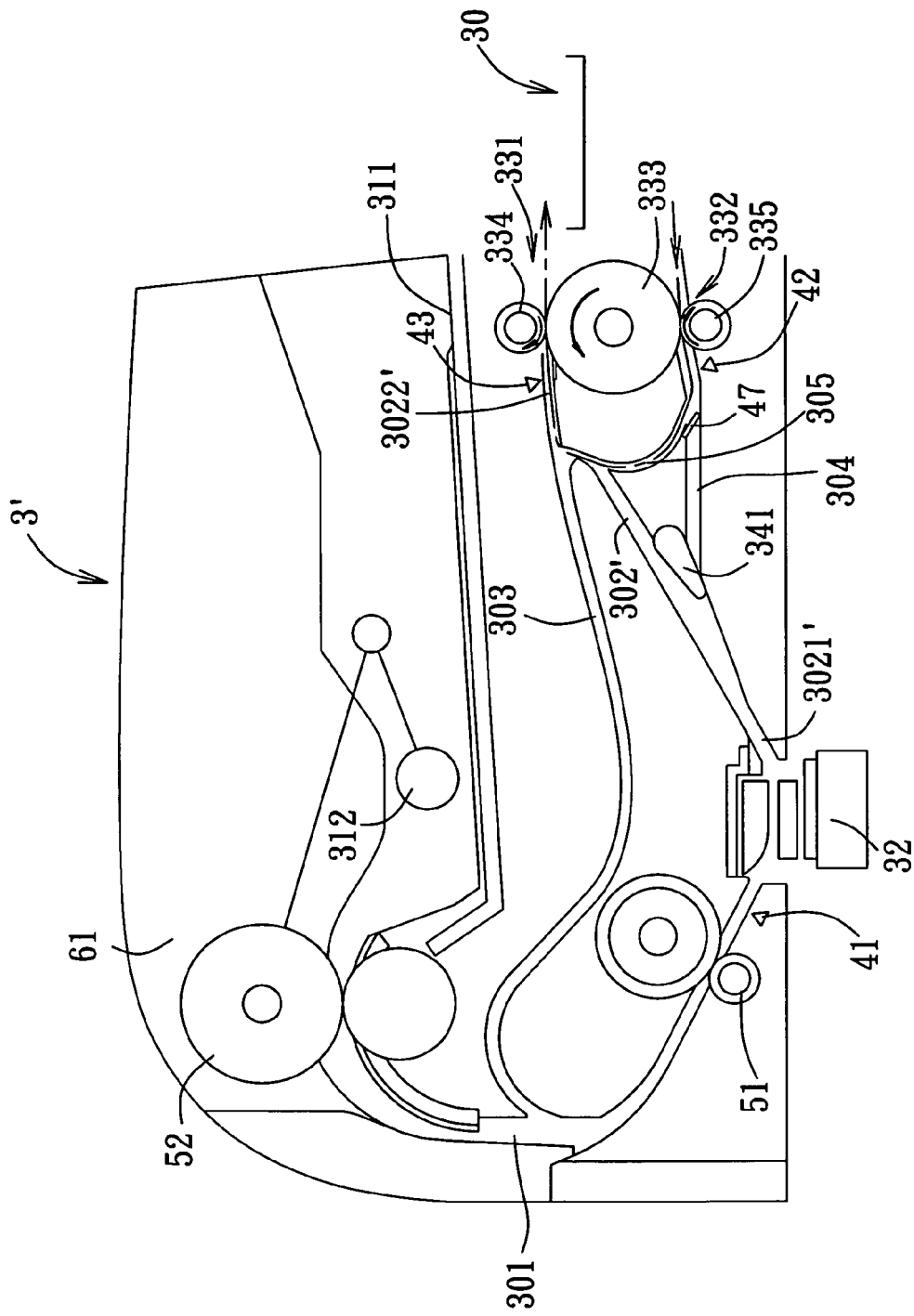
F I G. 5c

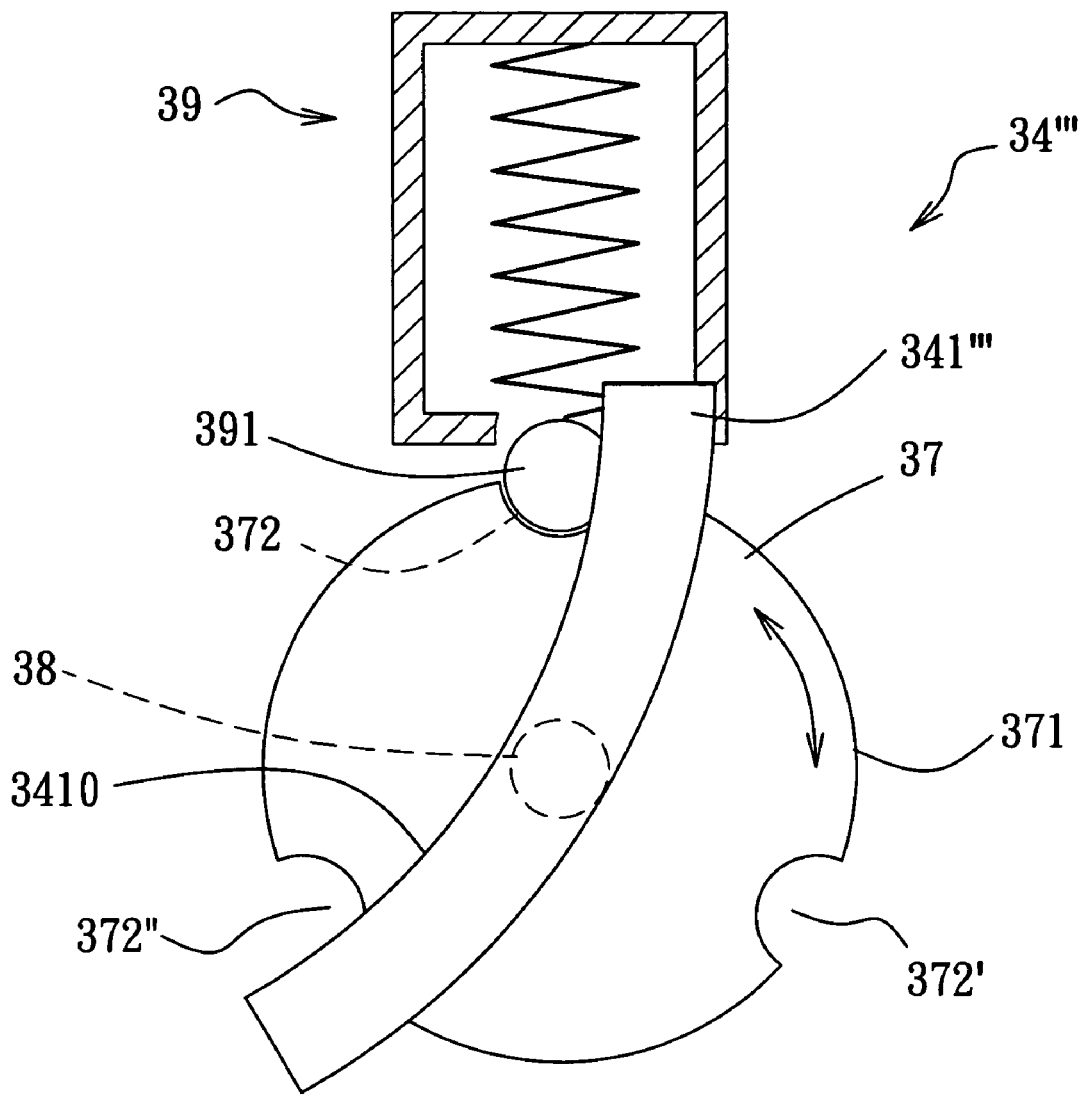
F I G. 6d ue to the
DUPLEX AUTOMATIC DOCUMENT FEEDER AND DUPLEX DOCUMENT SCANNING METHOD USING THE SAME

CROSS-REFERENCE TO RELATED APPLICATION

This is a Continuation-in-Part (CIP) of U.S. patent application Ser. No. 11/699,374, filed on Jan. 30, 2007 now U.S. Pat. No. 7,578,504. This application also claims priority of Taiwanese Application No. 096129815, filed on Aug. 13, 2007.

BACKGROUND OF THE INVENTION

1. Field of the Invention

This invention relates to a duplex automatic document feeder and a duplex document scanning method using the same, and more particularly to a duplex automatic document feeder applicable to a copy machine, and a duplex document scanning method using the same.

2. Description of the Related Art

Referring to FIG. 1, a compact auto-document feeder 1 disclosed in U.S. Pat. No. 5,784,680 includes a document setting tray 11, a scanning module 12, an ejecting tray 13, and a switching gate 14. A first transfer path 101 extends from the document setting tray 11 to the scanning module 12. A second transfer path 102 extends from the scanning module 12 to the ejecting tray 13. A third transfer path 103 extends from a rear end of the second transfer path 102 to the first transfer path 101. The switching gate 14 is disposed among the second, third, and fourth transfer paths 102, 103, 104. Operations of the feeder 1 performed on one document will be described hereinafter.

When the feeder 1 is operated in a simplex document-feeding mode, the document is fed from the document-setting tray 11, and is moved through the first transfer path 101 and the scanning module 12 for scanning of the document. Subsequently, the document is moved onto the ejecting tray 13 through the second transfer path 102 with the switching gate 14 being disposed in a first position shown by the solid lines in FIG. 1.

When the feeder 1 is operated in a duplex document-feeding mode, the document is moved from the first transfer path 101 onto the second transfer path 102 for scanning of a first side surface thereof. At the same time, the switching gate 14 is pivoted to a second position shown by the phantom lines in FIG. 1. Hence, the document is moved from the second transfer path 102 onto the fourth transfer path 104 and simultaneously interacts with a roller unit 16. Thereafter, the rotational directions of rollers of the roller unit 16 are changed so as to return the document to the first transfer path 101 via the third transfer path 103. Thus, the document is moved from the first transfer path 101 onto the second transfer path 102 once again so as to allow for scanning of a second side surface thereof. After completion of the scanning of the first and second side surfaces of the document, in order to enable ejection of the document with the first side surface of the document facing downwardly, the document must be further moved through a document-inverting path defined by the third transfer path 103, a downstream portion of the first transfer path 101, and the second transfer path 102 so as to drop from the downstream end of the second transfer path 102 onto the ejecting tray 13.

The feeder 1 has the following disadvantages:
1. The document-inverting path is long, thereby reducing the operating efficiency of the feeder 1.
2. Referring to FIG. 2, before a trailing end 151 of the document is moved from the roller unit 16, a leading end 152 of the document may be moved onto the roller unit 16, thereby resulting in occurrence of a paper jam.

To solve the paper jam problem, in US Patent Application Publication No. 2002/0054382 and U.S. Pat. No. 6,307,614, the roller unit 16 is replaced with two roller units each defining a nip.

Referring to FIG. 3, a duplex automatic document feeder 2 disclosed in US Patent Application Publication No. 2002/0054382 includes first, second, third, and fourth document-feeding paths 201, 202, 203, 204, a scanning module 22, a middle roller 23, an upper roller 24, and a lower roller 25. Relative positions among the first, second, and third document-feeding paths 201, 202, 203, as well as the scanning module 22 are similar to those of U.S. Pat. No. 5,784,680. The fourth document-feeding path 204 is U-shaped, and has upper and lower horizontal sections 205, 206, and a curved section 207. The middle roller 23 is disposed between the upper and lower horizontal sections 205, 206. The upper and lower rollers 24, 25 are in frictional contact with the middle roller 23, and are respectively adjacent to the upper and lower horizontal sections 205, 206 of the fourth document-feeding path 204. After completion of a second scanning operation, the document is moved from the second document-feeding path 202 onto the lower horizontal section 206 of the fourth document-feeding path 204. When the document is moved into a space between the middle roller 23 and the lower roller 25, the rotational directions of the middle roller 23 and the lower roller 25 are changed so as to allow the document to be moved onto the curved section 207 and the upper horizontal section 205 of the fourth document-feeding path 204, thereby passing through a space between the middle roller 23 and the upper roller 24. Finally, the document is moved from the middle roller 23 and the upper roller 24 onto a discharging tray (not shown).

The lower roller 25 is movable relative to the middle roller 23 between upper and lower positions shown respectively by the solid and phantom lines in FIG. 3 through operation of an elevating mechanism (not shown). When the lower roller 25 is moved to the lower position, two documents can be moved in two opposite directions through the space between the middle roller 23 and the lower roller 25, thereby preventing occurrence of a paper jam.

However, the structure of the feeder 2 is complex due to the presence of the elevating mechanism. This increases the manufacturing costs of the feeder 2.

SUMMARY OF THE INVENTION

The object of this invention is to provide a duplex automatic document feeder and a duplex document scanning method using the same that can overcome the abovementioned disadvantages associated with the prior art.

According to an aspect of this invention, there is provided a duplex automatic document feeder adapted for use in an image-formation device. The image-formation device has a scanning module for scanning a document. The duplex automatic document feeder comprises:

a feeding tray adapted for feeding the document;

a first path adapted to extend from the feeding tray to the scanning module so as to invert the document when the document is moved along the first path;

a feeding/separating roller adapted for moving the document from the feeding tray onto the first path;

an ejecting tray;

a first reversing roller unit disposed in proximity to the ejecting tray and adapted for allowing the document to move in a direction onto the ejecting tray and in an opposite direction to reverse the document;

a second path adapted to extend from the scanning module to the first reversing roller unit and adapted for guiding movement of the document just after a first scanning operation is performed on the document;

a third path in spatial communication with the first and second paths and adapted for guiding movement of the reversed document from the first reversing roller unit onto an intermediate portion of the first path;

a second reversing roller unit disposed in proximity to the first reversing roller unit and adapted for reversing the document;

a fourth path in spatial communication with the second path and the second reversing roller unit and adapted for guiding movement of the document just after a second scanning operation is performed on the document;

an ejecting path adapted for guiding movement of the document from the second reversing roller unit onto an intermediate portion of the second path; and a first guide unit adapted to be controlled to guide movement of the document along a selected one of the second and fourth paths.

According to another aspect of this invention, a duplex document scanning method comprises the steps of:

(a) moving a document along a first path to pass through a scanning module so as to perform a scanning operation on a first side surface of the document;

(b) moving the document along a second path into a first reversing roller unit;

(c) driving the first reversing roller unit to reverse and move the document from the first reversing roller unit onto the first path via a third path to thereby pass again through the scanning module so as to perform a scanning operation on a second side surface of the document opposite to the first side surface;

(d) moving the document along a fourth path into a second reversing roller unit; and (e) driving the second reversing roller unit to reverse and move the document from the second reversing roller unit into the first reversing roller unit via a portion of the fourth path, an ejecting path, and a portion of the second path onto an ejecting tray.

BRIEF DESCRIPTION OF THE DRAWINGS

These and other features and advantages of this invention will become apparent in the following detailed description of the preferred embodiments of this invention, with reference to the accompanying drawings, in which:

FIG. 5a is a schematic side view of the second preferred embodiment of a duplex automatic document feeder, illustrating a first-side scanning path;

FIG. 5b is a schematic side view of the second preferred embodiment, illustrating a second-side scanning path;

FIG. 5c is a schematic side view of the second preferred embodiment, illustrating a document-inverting path;

FIG. 6d is a schematic view of a first guide unit of the third preferred embodiment.

DETAILED DESCRIPTION OF THE PREFERRED EMBODIMENTS

Figure 1:
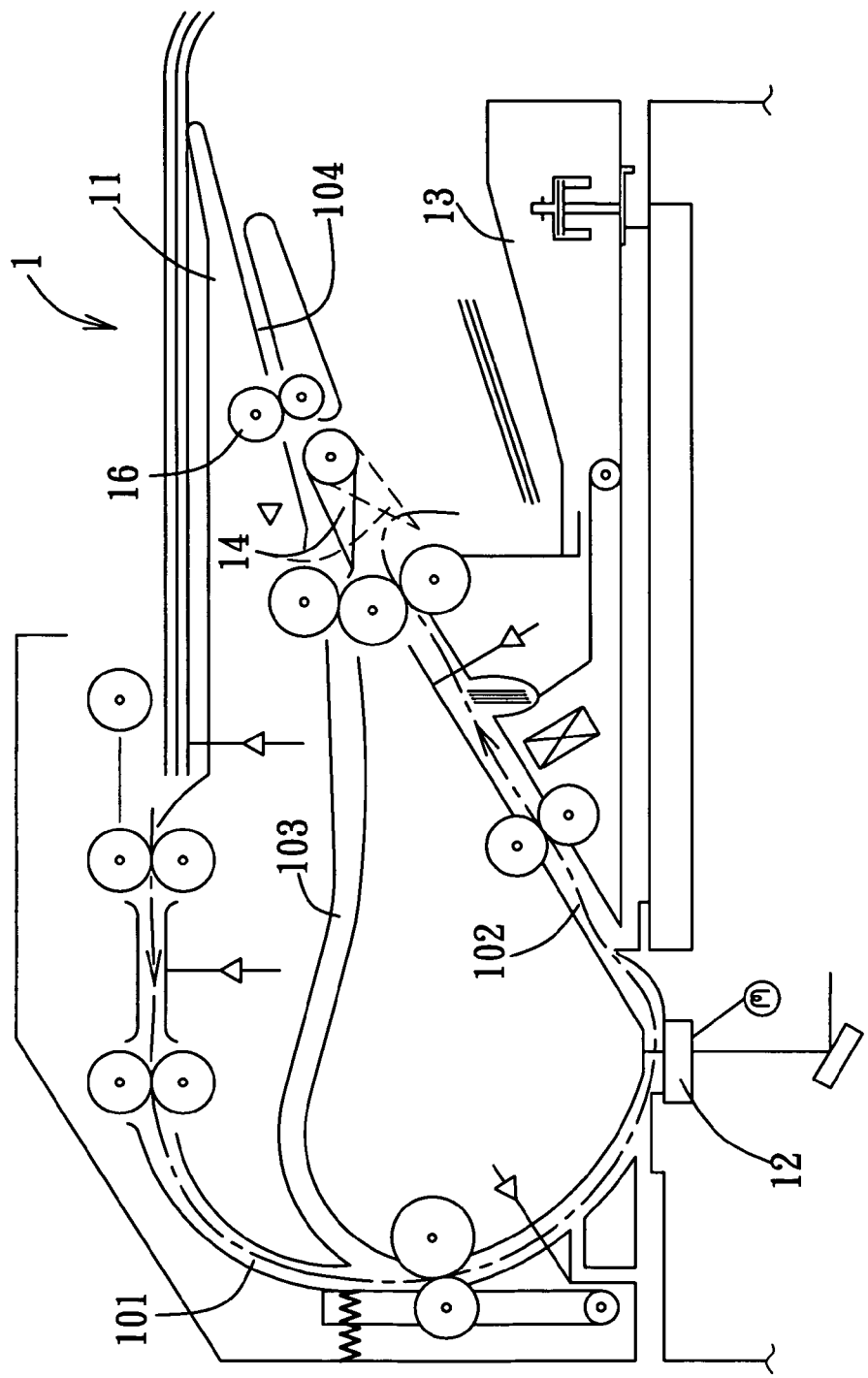
FIG. 1 is a schematic side view of a compact auto-document feeder disclosed in U.S. Pat. No. 5,784,680.
Figure 2:
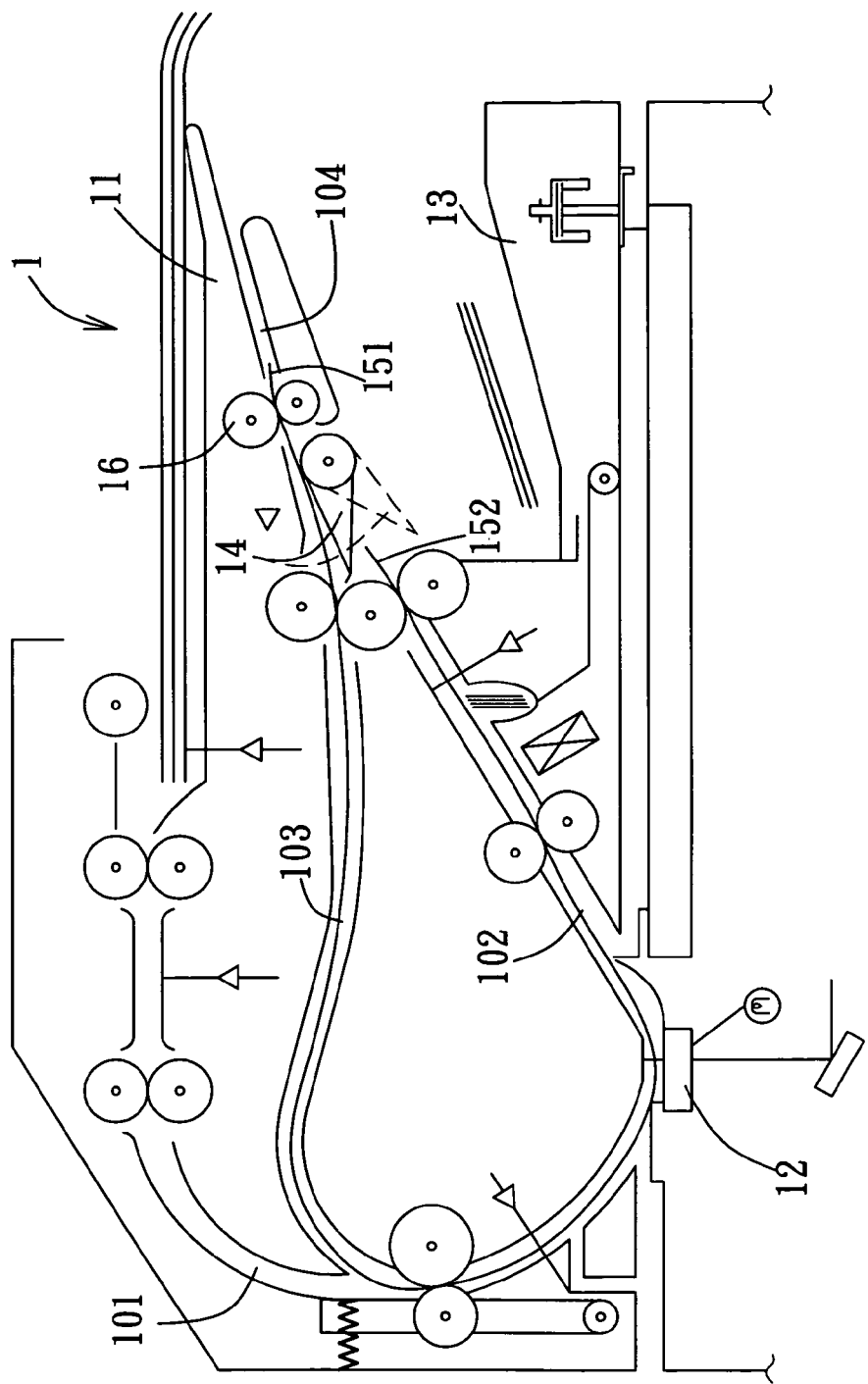
FIG. 2 is a schematic side view of the compact auto-document feeder of FIG. 1, illustrating how a paper jam may occur between second and third transfer paths.

Before the present invention is described in greater detail in connection with the preferred embodiments, it should be noted that similar elements and structures are designated by like reference numerals throughout the entire disclosure.

The duplex automatic document feeder of this invention is applicable to a copy machine, a fax machine, a scanner, or other image forming devices. In each of the following embodiments, this invention is described in an exemplary application to a copy machine.

Figure 4A:
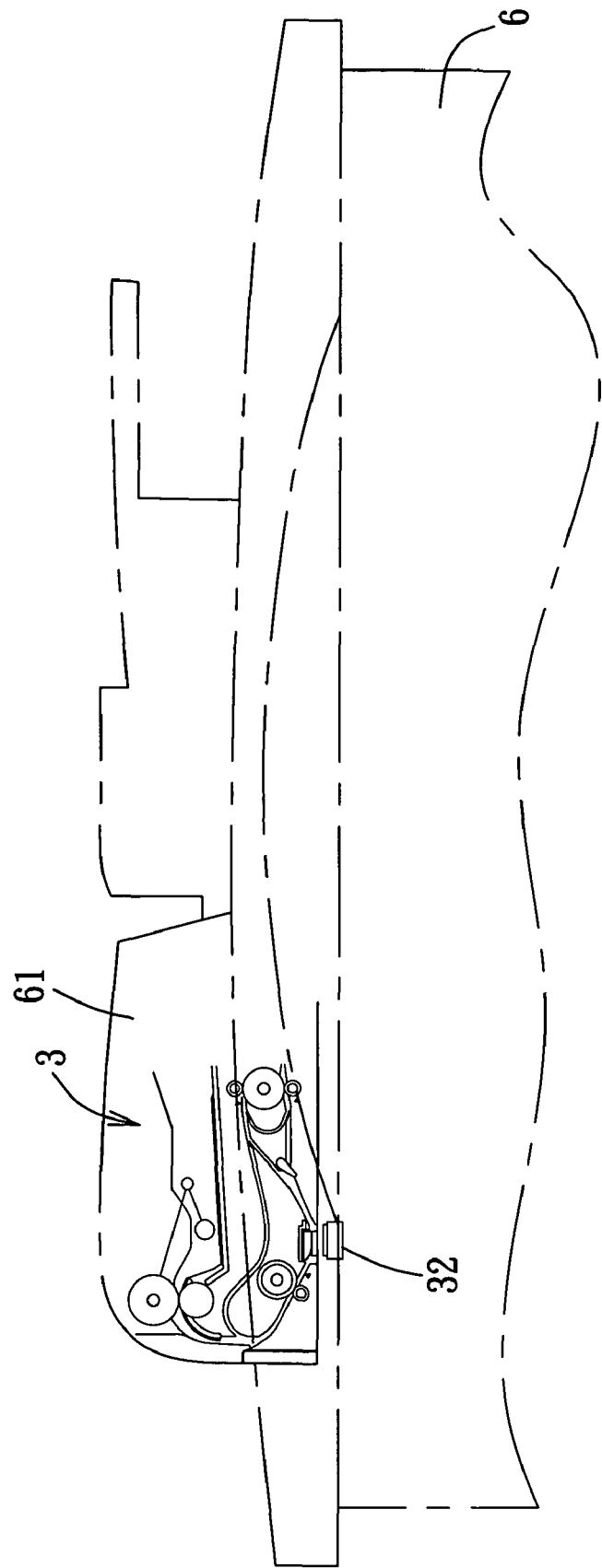
FIG. 4a is a fragmentary schematic side view of the first preferred embodiment of a duplex automatic document feeder according to this invention in a state of use with a copy machine.
Figure 4B:
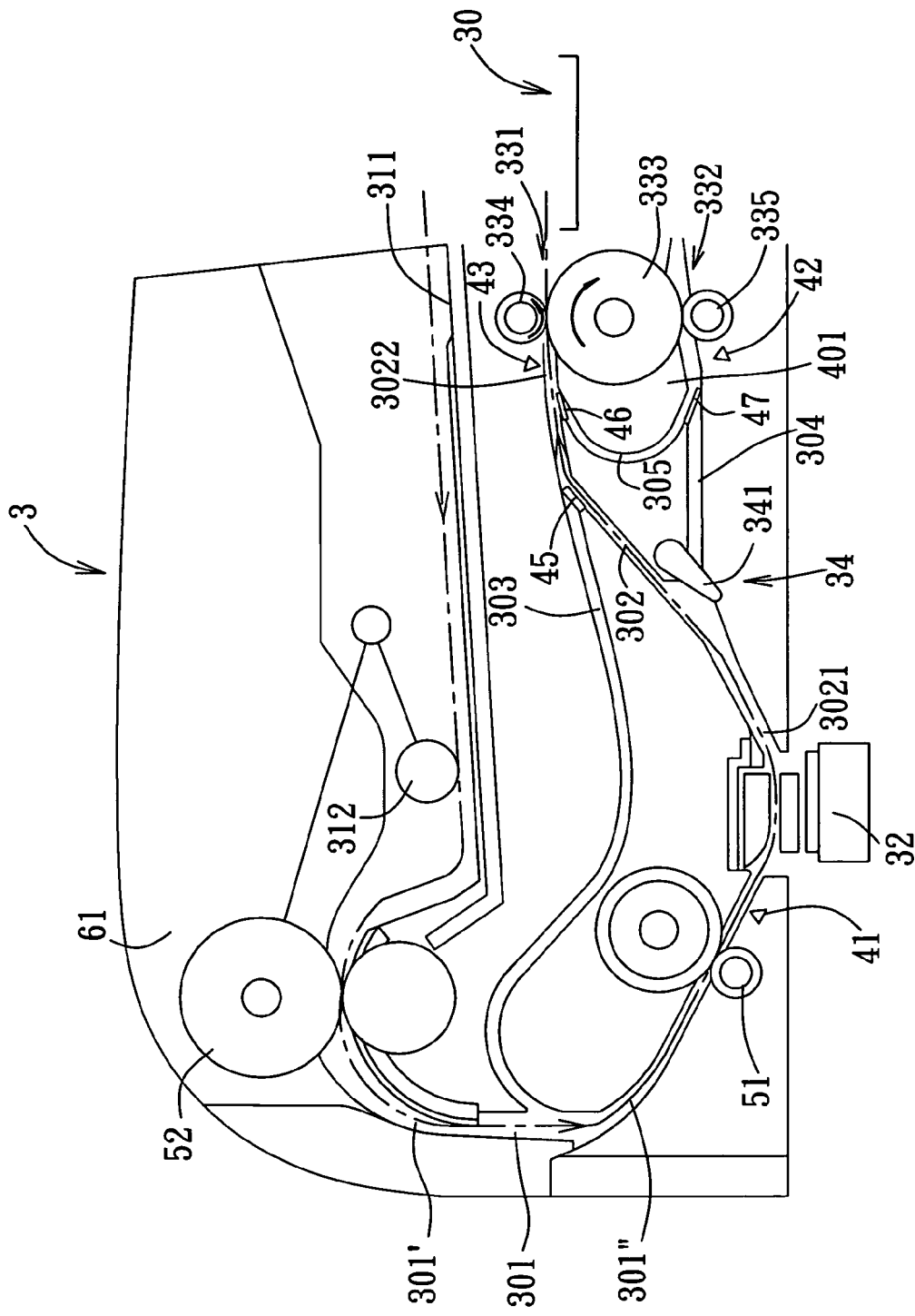
FIG. 4b is a schematic side view of the first preferred embodiment, illustrating a first-side scanning path.

Referring to FIGS. 4a and 4b, the copy machine 6 includes a top cover 61 and a scanning module 32. The first preferred embodiment of a duplex automatic document feeder according to this invention includes a housing unit defined by the top cover 61; a feeding tray 311 disposed in the housing unit; an ejecting tray 30; a pair of first and second reversing roller units 331, 332 disposed in proximity to the ejecting tray 30; a path assembly in spatial communication with the feeding tray 311, the ejecting tray 30, and the scanning module 32 and including a first path 301, a second path 302, a third path 303, a fourth path 304, and an ejecting path 305; a guide assembly including first, second, third, and fourth guide units 34, 45, 46, 47; a control module (not shown); and a sensor assembly including first, second, and third sensors 41, 42, 43.

The scanning module 32 is disposed under the feeding tray 311. The first path 301 extends from the feeding tray 311 to the scanning module 32. Two transfer roller units 51, 52 are disposed along the first path 301 and in proximity to the scanning module 32 and the feeding tray 311, respectively. The first sensor 41 is disposed along the first path 301 between the transfer roller unit 51 and the scanning module 32. A stack of documents (not shown) to be scanned can be placed on the feeding tray 311 such that the uppermost document (referred to as "the document" hereinafter) is in frictional contact with the feeding/separating roller 312. The feeding/separating roller 312 is driven by a motor (not shown) to move the document onto the first path 301. Through operation of the transfer roller units 51, 52, the document is moved from the first path 301 onto the second path 302 via the scanning module 32. When the document is moved along the first path 301, it is inverted. When the document is passed through the scanning module 32, it is scanned.

The second path 302 has a front end 3021 in spatial communication with a downstream or lower end of the first path 301, and a rear end 3022 in spatial communication with the first reversing roller unit 331. The first reversing roller unit 331 is disposed in proximity to and between the ejecting tray 30 and the rear end 3022 of the second path 302. The first reversing roller unit 331 includes a middle roller 333 and an upper roller 334 flanking the rear end 3022 of the second path 302. The upper roller 334 is disposed above and in frictional contact with the middle roller 333 to define a nip therebetween. The middle roller 333 can be driven by a motor (not shown) of the control module to rotate clockwise to thereby move the document onto the ejecting tray 30, or counterclockwise to reverse the document. The third sensor 43 is disposed in proximity to the rear end 3022 of the second path 302 and the first reversing roller unit 331 so as to output a signal for activation of the first reversing roller unit 331 to rotate just before the document is moved into the first reversing roller unit 331.

The third path 303 is disposed between the feeding tray 311 and the second path 302, and has a front end in spatial communication with an intermediate portion of the first path 301, and a rear end in spatial communication with a portion of the second path 302 adjacent to the rear end 3022. As such, the first path 301 has an upper path portion 301' disposed above the front end of the third path 303, and a lower path portion 301" disposed below the front end of the third path 303.

Figure 4C:
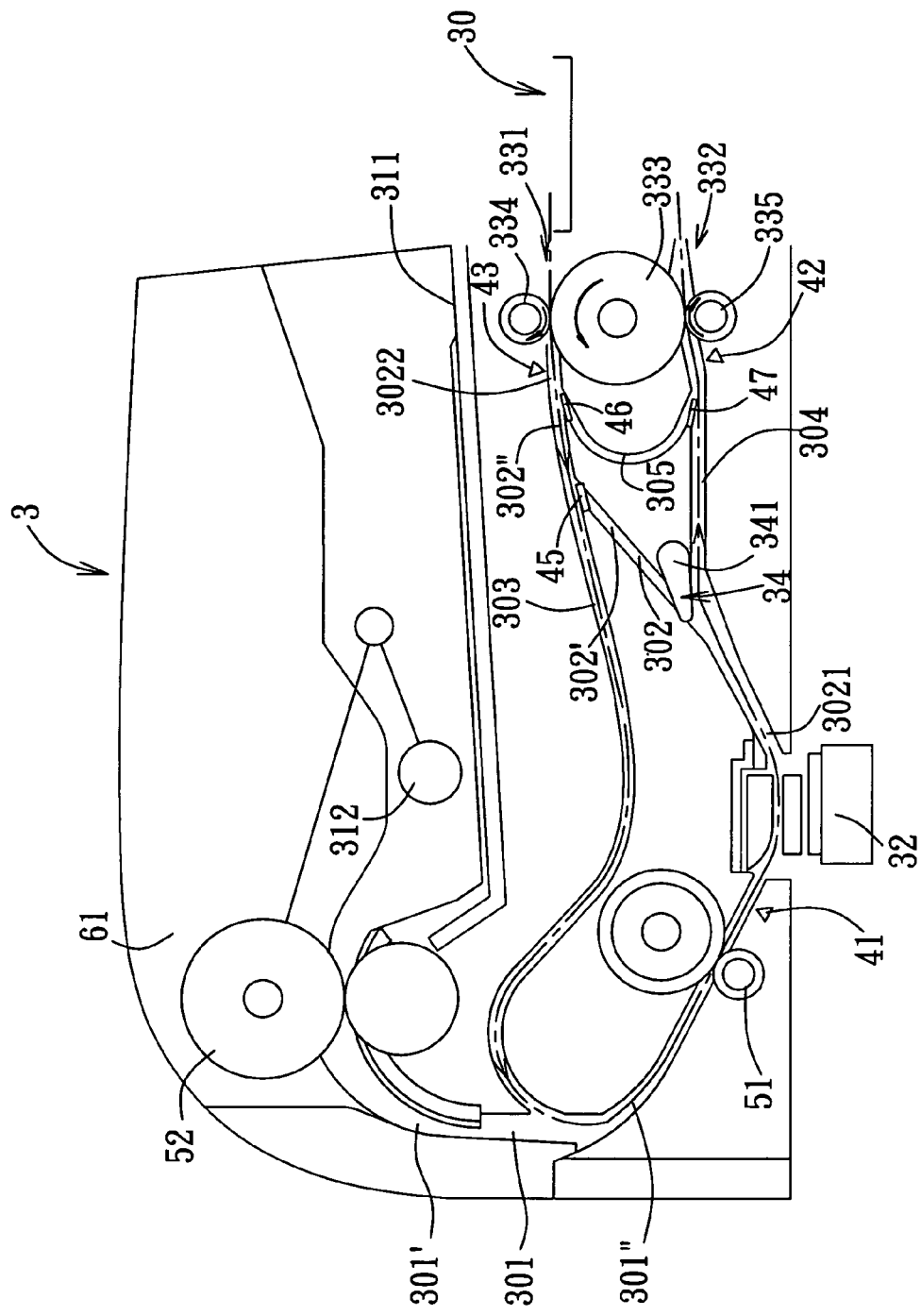
FIG. 4c is a schematic side view of the first preferred embodiment, illustrating a second-side scanning path.

The second guide unit 45 is disposed at a junction between the second and third paths 302, 303, and is configured as an elongated Mylar plate having a fixed end and a movable end that is disposed at a close position shown in FIG. 4c when no external force is applied thereto, and that is pushable to an open position shown in FIG. 4b. The second path 302 is divided by the second guide unit 45 into a front path section 302' distal from the first reversing roller unit 331, and a rear path section 302" proximate to the first reversing roller unit 331, as shown in FIG. 4c. As such, the second guide unit 45 can prevent movement of the document from the rear path section 302" to the front path section 302' along the second path 302 while allowing for movement of the document from the front path section 302' to the rear path section 302" along the second path 302. The third and fourth guide units 46, 47 are similar to the second guide unit 45 in construction.

The fourth path 304 has a front end in spatial communication with a portion of the second path 302 adjacent to the front end 3021 of the second path 302, and a rear end in spatial communication with the second reversing roller unit 332. The second reversing roller unit 332 includes the middle roller 333 and a lower roller 335 flanking the rear end of the fourth path 304. The lower roller 335 is disposed under and in frictional contact with the middle roller 333 to define a nip therebetween. The second sensor 42 is disposed in proximity to the fourth path 304 and the second reversing roller unit 332 so as to output a signal for activation of the second reversing roller unit 332 to rotate just before the document is moved into the second reversing roller unit 332.

The first guide unit 34 includes a switching gate 341 disposed pivotally at a junction between the second and fourth paths 302, 304. The switching gate 341 is pivotable between a first position shown in FIG. 4b and a second position shown in FIG. 4c. In the first position, the switching gate 341 closes the front end of the fourth path 304 to limit movement of the document into the first reversing roller unit 331 via the second path 302. In the second position, the switching gate 341 closes the second path 302 to limit movement of the document into the first reversing roller unit 331 via the fourth path 304.

The ejecting path 305 is provided at a mounting member 401 disposed fixedly in the housing unit, and has upper and lower ends in spatial communication with the second and fourth paths 302, 304, respectively.

The third guide unit 46 is disposed at a junction between the ejecting path 305 and the second path 302 so as to prevent movement of the document from the second path 302 onto the ejecting path 305 while allowing for movement of the document from the ejecting path 305 onto the second path 302. The fourth guide unit 47 is disposed at a junction between the ejecting path 305 and the fourth path 304 so as to prevent movement of the document from the ejecting path 305 onto the fourth path 304 while allowing for movement of the document from the fourth path 304 onto the ejecting path 305.

With particular reference to FIG. 4b, a first-side scanning path is defined by the feeding tray 311, the first path 301, the second path 302, and the first reversing roller unit 331.

With particular reference to FIG. 4c, a second-side scanning path is defined by the first reversing roller unit 331, the rear path portion 302" of the second path 302, the third path 303, the lower path portion 301" of the first path 301, the fourth path 304, and the second reversing roller unit 332.

Figure 4D:
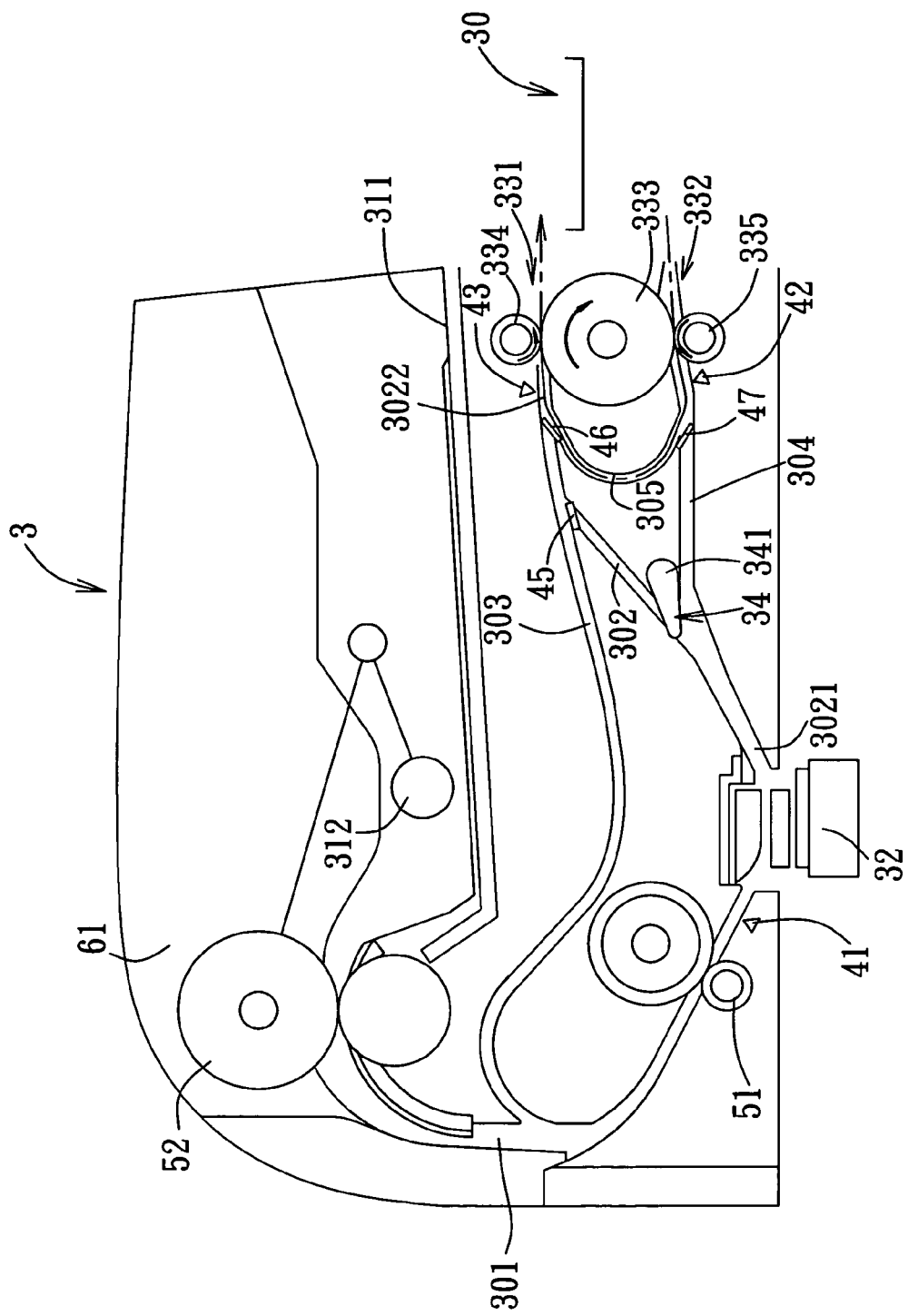
FIG. 4d is a schematic side view of the first preferred embodiment, illustrating a document-inverting path.

With particular reference to FIG. 4d, a document-reversing path is defined by the second reversing roller unit 332, a rear end portion of the fourth path 304, the ejecting path 305, the rear end 3022 of the second path 302, the first reversing roller unit 331, and the ejecting tray 30.

A duplex document scanning method using the duplex automatic document feeder 3 includes the following steps:

(a) moving the document from the feeding tray 311 onto the first path 301;

(b) moving the document along the first path 301 to invert the document to thereby pass through the scanning module 32 so as to perform a scanning operation on a first side surface of the document;

(c) pivoting the switching gate 341 to the first position as a result of passage of the document through the scanning module 32 as detected by the first sensor 41;

(d) moving the document along the second path 302 into the first reversing roller unit 331 with the second guide unit 45 being pushed to open the rear path portion 302" of the second path 302;

(e) driving the middle roller 333 to rotate counterclockwise as a result of movement of the document into the first reversing roller unit 331 as detected by the third sensor 43 to reverse and move the document from the first reversing roller unit 331 onto the first path 301 via the third path 303 to invert again the document to thereby pass again through the scanning module 32 so as to perform a scanning operation on a second side surface of the document opposite to the first side surface;

(f) pivoting the switching gate 341 to the second position as a result of second passage of the document through the scanning module 32 as detected by the first sensor 41;

(g) moving the document along the fourth path 304 into the second reversing roller unit 332 with the fourth guide unit 47 being pushed to open the fourth path 304 at the junction between the fourth path 304 and the ejecting path 305; and (h) driving the middle roller 333 to rotate clockwise as a result of movement of the document into the first reversing roller unit 331 as detected by the second sensor 42 to reverse and move the document from the second reversing roller unit 332 into the first reversing roller unit 331 via the rear end portion of the fourth path 304, the ejecting path 305, and the rear end 3022 of the second path 302, to thereby invert and drop the document onto the ejecting tray 30.

Figure 3:
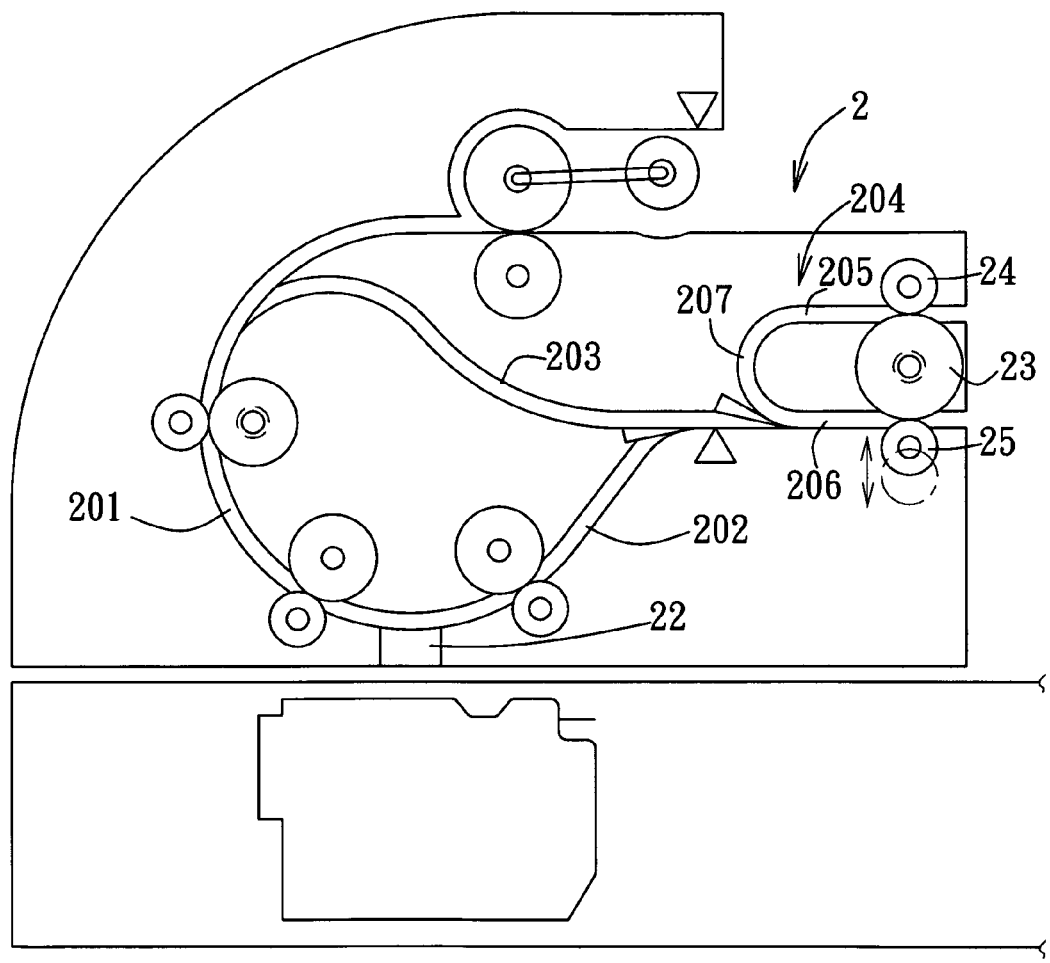
FIG. 3 is a schematic side view of a duplex automatic document feeder disclosed in US Patent Application Publication No. 2002/0054382.

Due to the presence of the fourth path 304, occurrence of paper jams can be prevented, and the distance traveled by the document is reduced significantly, thereby improving the operating efficiency of the feeder 3 as compared to that of U.S. Pat. No. 5,784,680. Furthermore, the structure for changing the position of the switching gate 341 is simpler than that for moving the lower roller 25 (see FIG. 3) disclosed in US Patent Application Publication No. 2002/0054382.

Figure 4E:
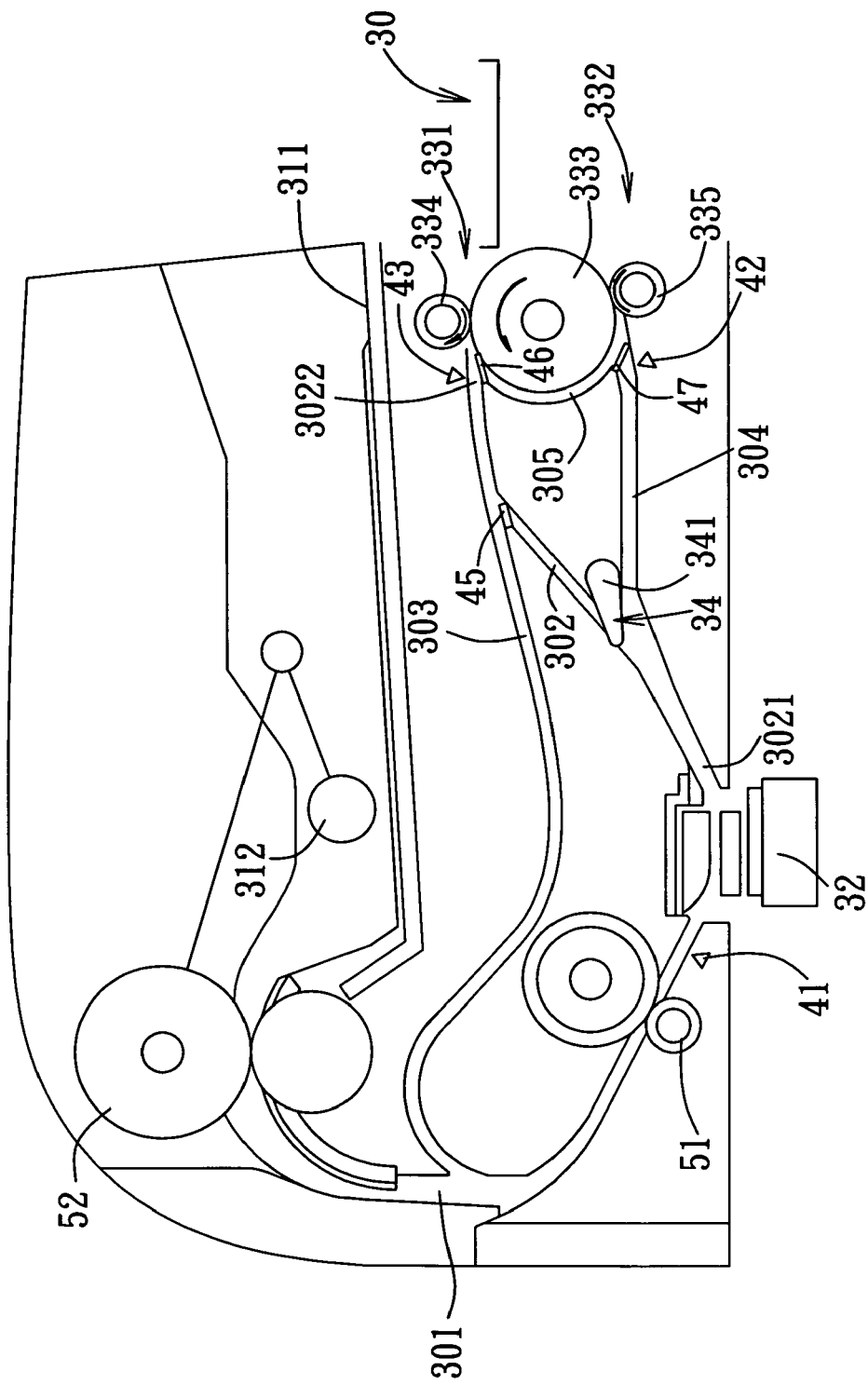
FIG. 4e is a schematic side view illustrating a modification to an ejecting path of the first preferred embodiment.

Alternatively, with reference to FIG. 4e, the ejecting path 305 is defined directly by an outer peripheral surface of the middle roller 333, and the mounting member 401 is omitted from the housing unit.

FIGS. 5a, 5b, 5c, 5d, and 5e show the second preferred embodiment of a duplex automatic document feeder 3' according to this invention, which is similar in construction to the first preferred embodiment. In this embodiment, the second path 302' is in spatial communication with the ejecting path 305 at a position under that whereat the second path 302' is in spatial communication with the third path 303. In addition, the third guide unit 46 (see FIG. 4b) is omitted from the junction between the second and third paths 302', 303.

A duplex document scanning method using this embodiment is the same as that using the first preferred embodiment.

Figure 5D:
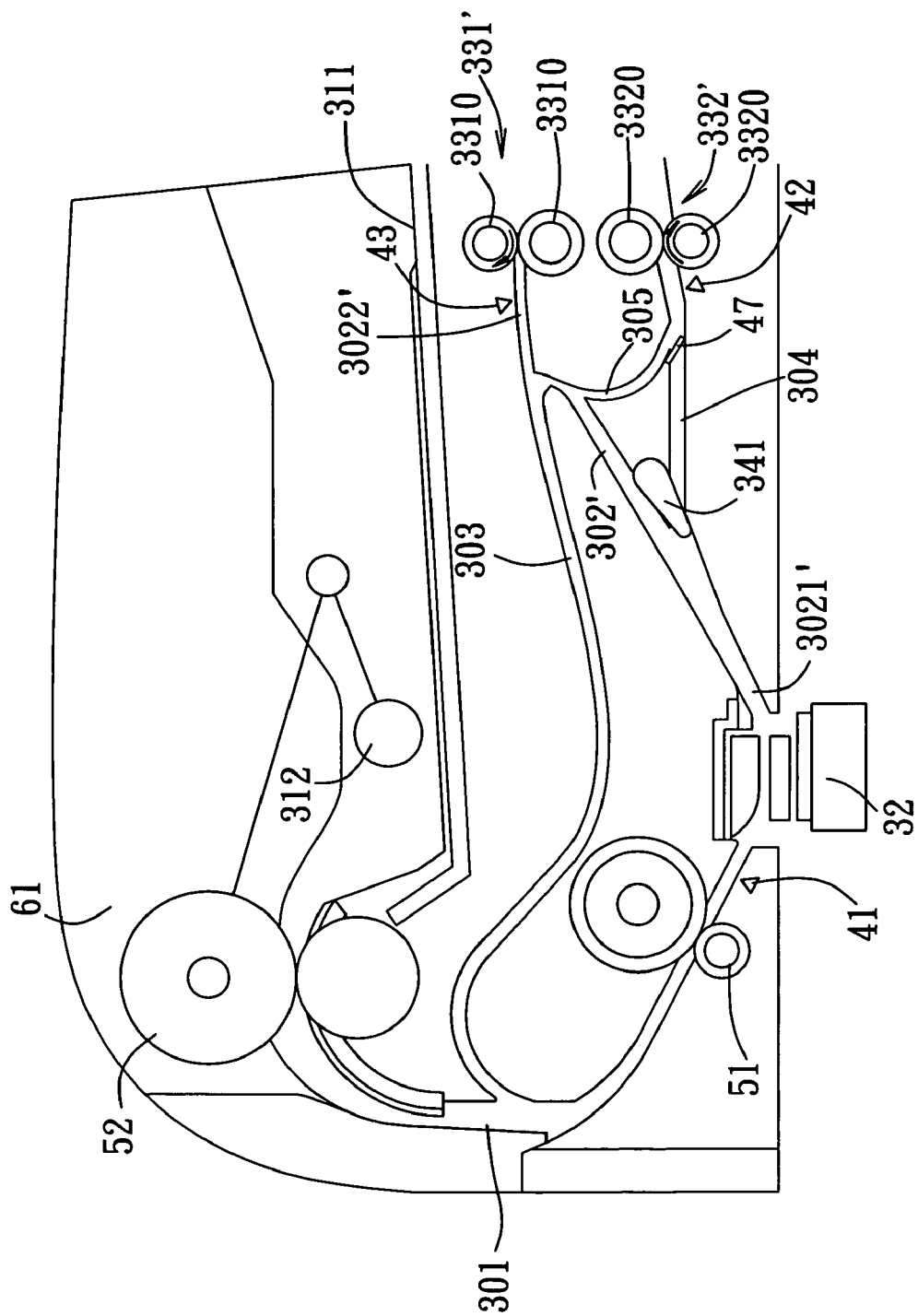
FIG. 5d is a schematic side view illustrating a modification to first and second reversing roller units of the second preferred embodiment.

FIG. 5d shows modified first and second reversing roller units 331', 332'. The modified first reversing unit 331' includes two rollers 3310 flanking the rear end 3022' of the second path 302' and defining a nip therebetween so as to allow for movement of the document therebetween. The modified second reversing roller unit 332' includes two rollers 3320 flanking the rear end of the fourth path 304 and defining a nip therebetween so as to allow for movement of the document therebetween.

Figure 5E:
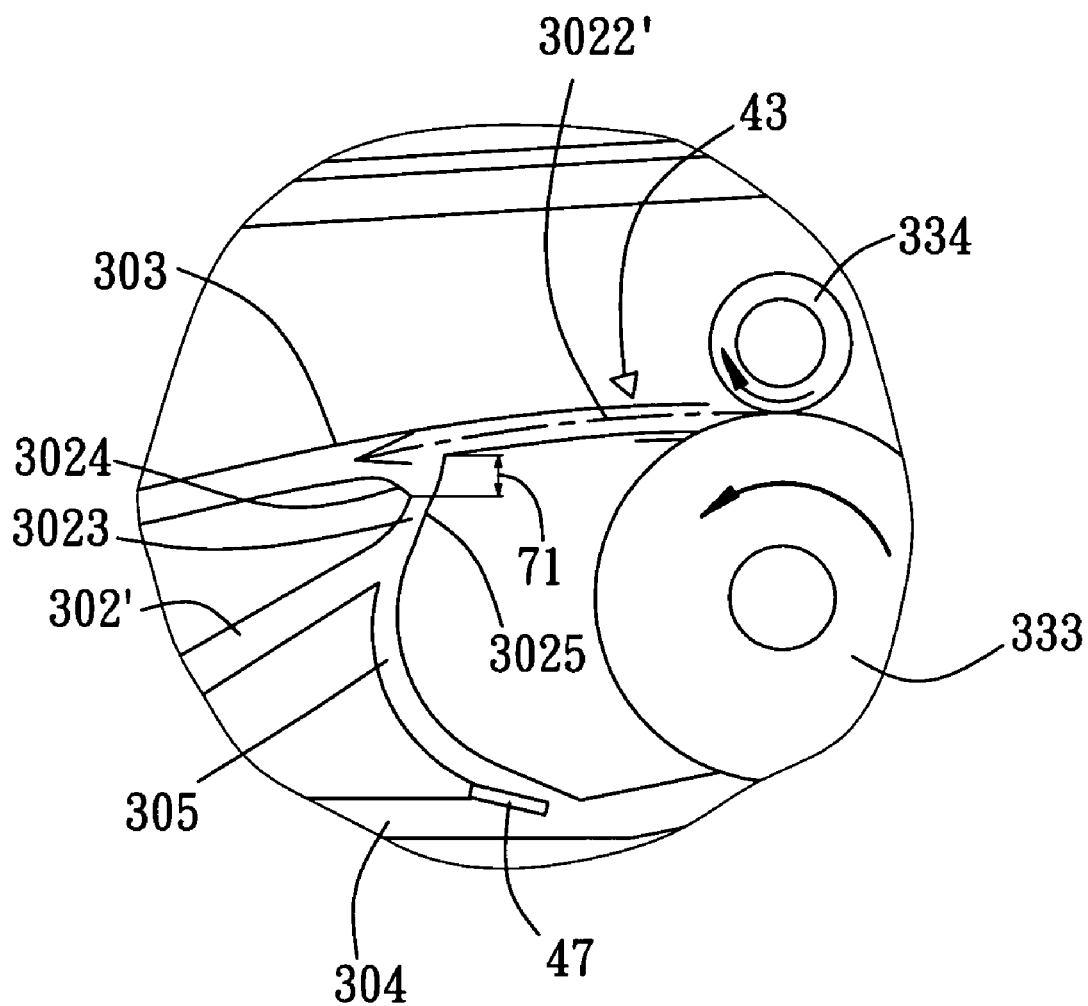
FIG. 5e is a fragmentary schematic side view of the second preferred embodiment, illustrating a junction between second and third paths.

With particular reference to FIG. 5e, an intermediate path segment 3023 of the second path 302' located between the ejecting path 305 and the third path 303 is defined by a front wall surface 3024 and a rear wall surface 3025. To compensate for omission of the third guide unit 46 (see FIG. 4b), a top end of the rear wall surface 3025 is higher than that of the front wall surface 3024 by a distance 71 so as to prevent movement of the document from the rear end 3022' of the second path 302' to the intermediate path segment 3023 while allowing for movement of the document from the intermediate path segment 3023 to the rear end 3022' of the second path 302'.

Figure 6A:
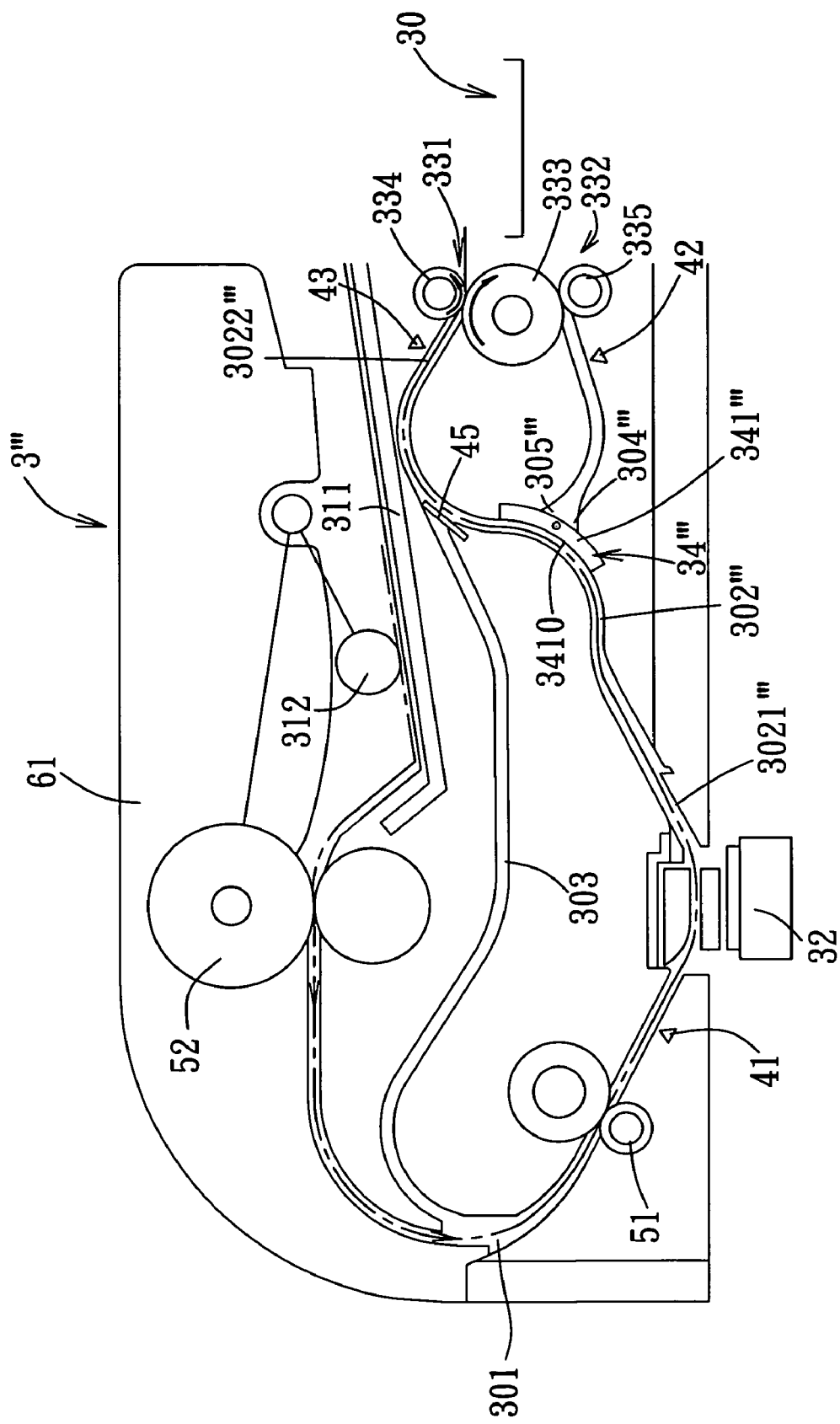
FIG. 6a is a schematic side view of the third preferred embodiment of a duplex automatic document feeder, illustrating a first-side scanning path.
Figure 6B:
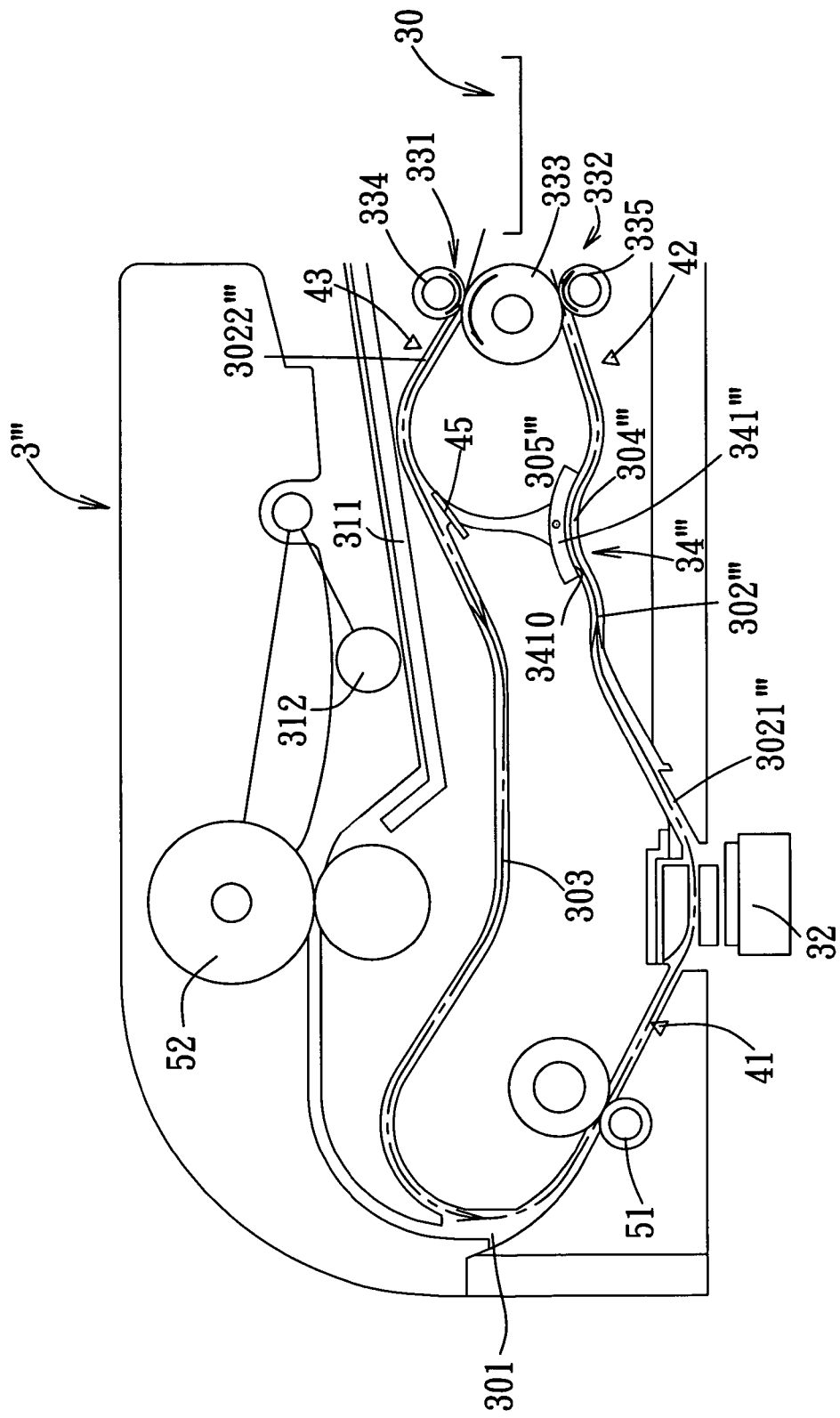
FIG. 6b is a schematic side view of the third preferred embodiment, illustrating a second-side scanning path.
Figure 6C:
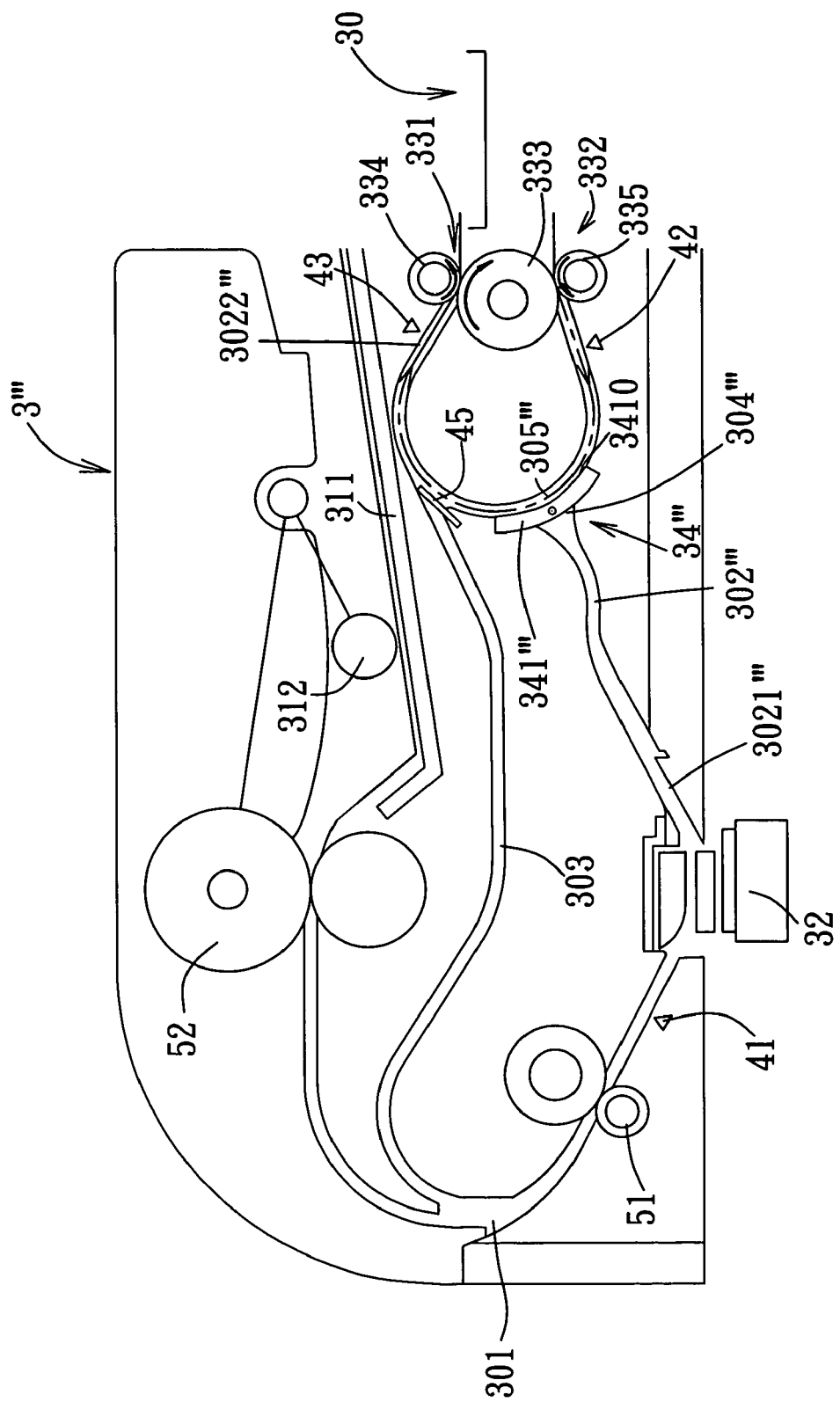
FIG. 6c is a schematic side view of the third preferred embodiment, illustrating a document-inverting path.

FIGS. 6a, 6b, and 6c, show the third preferred embodiment of a duplex automatic document feeder 3''' according to this invention, which is similar in construction to the previous preferred embodiments. The main difference between this embodiment and the previous preferred embodiments resides in that the ejecting path 305 is in spatial communication with the junction between the second path 302''' and the fourth path 304'''.

With particular reference to FIG. 6d, the first guide unit 34''' in this embodiment includes a switching gate 341''' configured as a curved rod, a rotary disk 37, and a solenoid valve 39. The rotary disk 37 is formed with an integral rotating shaft 38 that is connected fixedly to a middle portion of the switching gate 341''' and that is disposed rotatably at the junction between the second and fourth paths 302''', 304'''. The rotary disk 37 has an outer periphery 371 formed with first, second, and third positioning notches 372, 372', 372''. The solenoid valve 39 includes an engaging member 391 in the form of a ball. The engaging member 391 is biased to move into the first positioning notch 372 when the switching gate 341''' is disposed in a first position shown in FIG. 6a, into the second positioning notch 372' when the switching gate 341''' is disposed in a second position shown in FIG. 6b, and into the third positioning notch 372'' when the switching gate 341''' is disposed in a third position shown in FIG. 6c. The solenoid valve 39 is activated so as to remove the engaging member 391 from the rotary disk 37 just before the switching gate 341''' is pivoted in the housing unit. With particular reference to FIG. 6a, in the first position, a curved guiding surface 3410 of the switching gate 341''' extends along an intermediate portion of the second path 302'''. When the first scanning operation is completed, the switching gate 341''' is disposed in this position so as to limit movement of the document from the front end 3021''' of the second path 302''' to the rear end 3022''' of the second path 302'''. Hence, the document is moved into the first reversing roller unit 331. With particular reference to FIG. 6b, in the second position, the curved guiding surface 3410 of the switching gate 341''' extends between the second and fourth paths 302''', 304'''. When the second scanning operation is completed, the switching gate 341''' is pivoted to this position so as to limit movement of the document from the second path 302''' into the second reversing roller unit 332 via the fourth path 304'''. With particular reference to FIG. 6c, in the third position, the curved guiding surface 3410 of the switching gate 341''' extends between the ejecting path 305''' and the fourth path 304'''. When the document is moved from the second reversing roller unit 332, the switching gate 341''' is pivoted to this position so as to limit movement of the document from the fourth path 304''' into the first reversing roller unit 331 via the ejecting path 305'''. Hence, the document is inverted and moved onto the ejecting tray 30.

Figure 6E:
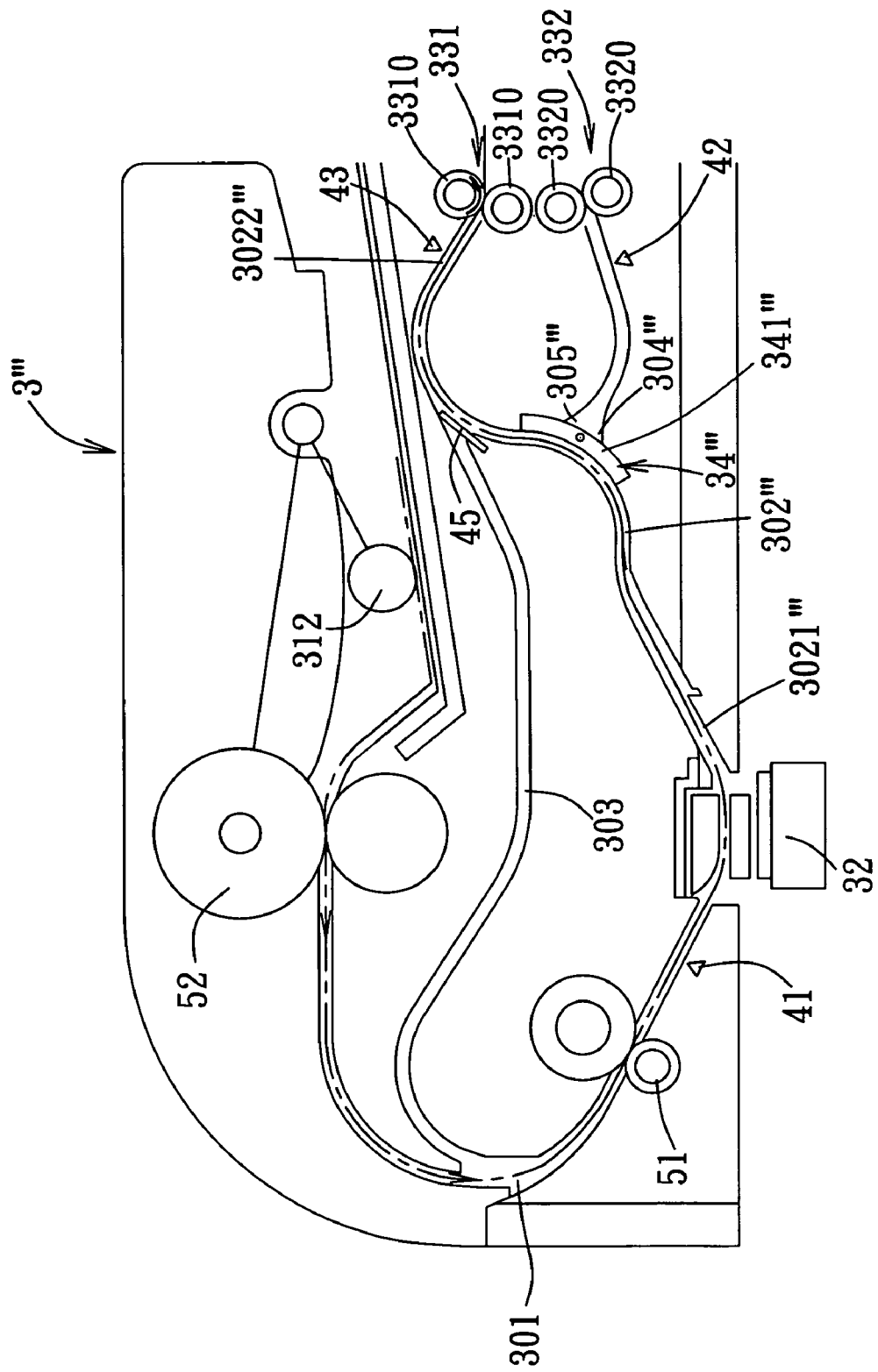
FIG. 6e is a schematic side view illustrating a modification to first and second reversing roller units of the third preferred embodiment.

With reference to FIG. 6e, similar to the second preferred embodiment, the first reversing unit 331 may be modified to include two rollers 3310 flanking the rear end 3022''' of the second path 302''' and defining a nip therebetween so as to allow for movement of the document therebetween, and the second reversing roller unit 332 may be modified to include two rollers 3320 flanking the rear end of the fourth path 304''' and defining a nip therebetween so as to allow for movement of the document therebetween.

In view of the above, in the duplex automatic document feeder, since the upper and lower rollers 334, 335 are not movable relative to the middle roller 333, it is not necessary to provide an elevating mechanism for moving the upper and lower rollers 334, 335, thereby resulting in a simple structure. Furthermore, leading and trailing ends of the document cannot be clamped between the first or second reversing roller unit 331, 332. Thus, occurrence of a paper jam can be avoided.

With this invention thus explained, it is apparent that numerous modifications and variations can be made without departing from the scope and spirit of this invention. It is therefore intended that this invention be limited only as indicated by the appended claims.

We claim:

1. A duplex document scanning method comprising the steps of:
   (a) moving a document along a first path to pass through a scanning module so as to perform a scanning operation on a first side surface of the document;
   (b) moving the document along a second path into a first reversing roller unit;

(c) driving the first reversing roller unit to reverse and move the document from the first reversing roller unit onto the first path via a third path to thereby pass again through the scanning module so as to perform a scanning operation on a second side surface of the document opposite to the first side surface;

(d) moving the document along a fourth path into a second reversing roller unit; and (e) driving the second reversing roller unit to reverse and move the document from the second reversing roller unit into the first reversing roller unit via a portion of the fourth path, an ejecting path, and a portion of the second path, to thereby drop onto an ejecting tray.

2. The duplex document scanning method as claimed in claim 1, between the steps (c) and (d), further comprising a step of moving a switching gate to a position to prevent movement of the document onto the second path while allowing for movement of the document onto the fourth path.

3. The duplex document scanning method as claimed in claim 1, before said step (a), further comprising a step of moving the document from a feeding tray onto the first path.

4. The duplex document scanning method as claimed in claim 3, where:

in said step (a), the document is inverted during movement thereof along the first path;

in said step (c), the document is inverted during movement thereof along the first path; and in said step (e), the document is inverted during movement thereof from the second reversing roller unit into the first reversing roller unit.

* * * * *